though it is notorious that evaluation of the results obtained thereby is extremely difficult. Viz., sedimentation investigations supply the so-called settling curve which plots weight variations of the settled material or variations of the specific weight of the suspension in dependence on time. What is intended is to ascertain—on basis of such curves—the quantity and size of particles of which the suspended material is composed. However, the settling of heterodisperse suspensions is a complicated and composed procedure. In each time period a fraction of the floating particles will settle, such fraction being proportional to the particle size and to the relative quantity of the fraction. Thus, the settling curve showing the variations of weight and specific weight, respectively, is obtained as the result of a great number of partial procedures so that the settling curve is unsuitable for readings as to the quantity of individual particle fractions and particle sizes.

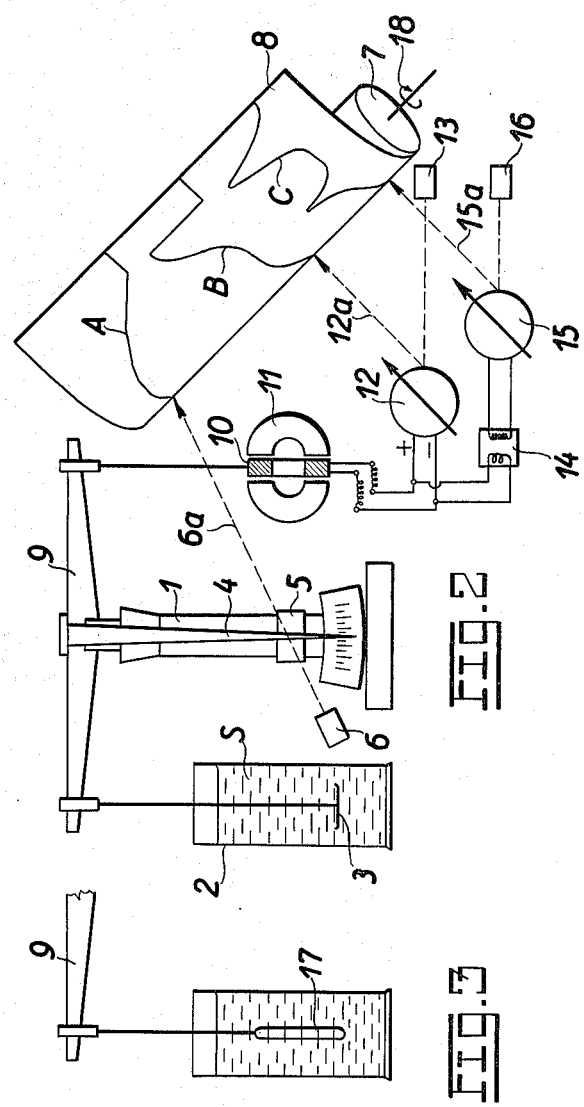

United States Patent Office 3,243,994
Patented Apr. 5, 1966

3,243,994
METHOD FOR THE EXAMINATION OF THE SEPARATION OF SUSPENSIONS AND EMULSIONS
Laszlo Erdey, Ferenc Paulik, Jeno Paulik, and Istvan Zagyvai, Budapest, Hungary, assignors to Metrimpex Magyar Muszeripari Kulkereskedelmi Vallalat, Budapest, Hungary
Filed Nov. 12, 1963, Ser. No. 322,920
2 Claims. (Cl. 73—61)

This application is a continuation-in-part of our application Serial No. 79,105, filed December 20, 1960, now abandoned.

This invention relates to a method of and an apparatus for simultaneously determining and registering, and for common evaluation of the basic curve of settling of liquid mixtures, such as suspensions and emulsions, and of its first and second derivatives.

The settling time of solid particles in liquid mixtures is characteristic of the particle size. Several methods have been suggested to determine such settling time of which methods of Oden and Hahn, respectively, are to be mentioned.

Oden's method (Internationale Mitteilungen für Bodenkunde 5, 257 (1915)) serves for investigating suspended materials of particles of larger size and short settling times. According to this method, the scale pan of a suitable balance is disposed in a suspension under test and weight of material settled on the scale pan is continuously measured in dependence on time.

By means of the Hahn method (Dissertation, Leipzig, 1921) only suspensions of extraordinarily fine distribution and long settling times can be investigated. His method is based on the principle that the specific weight of a suspension undergoes a changement in the course and in consequence of settling. By means of a float, suspended on the arm of a scale and submerged in the suspension the variation of the specific weight of the latter can be traced in dependence on time.

Both aforesaid methods have been employed for about fifty years without any changement. Sedimentation balances as manufactured at present work likewise on the principles of one of the aforesaid methods, although it is notorious that evaluation of the results obtained thereby is extremely difficult. Viz., sedimentation investigations supply the so-called settling curve which plots weight variations of the settled material or variations of the specific weight of the suspension in dependence on time. What is intended is to ascertain—on basis of such curves—the quantity and size of particles of which the suspended material is composed. However, the settling of heterodisperse suspensions is a complicated and composed procedure. In each time period a fraction of the floating particles will settle, such fraction being proportional to the particle size and to the relative quantity of the fraction. Thus, the settling curve showing the variations of weight and specific weight, respectively, is obtained as the result of a great number of partial procedures so that the settling curve is unsuitable for readings as to the quantity of individual particle fractions and particle sizes.

When evaluating the settling curve, tangents are drawn at its points of interest. Points of intersection of such tangents with the axis of ordinates indicate the total quantity of the various fractions settled during a given period. However, the tangents associated with given points of the characterless settling curve cannot be drawn with required accuracy and, therefore, a quantitative evaluation of the curve is not even approximately accurate and supplies at most data of only informative character.

The main object of the present invention is to eliminate the aforesaid difficulties and to provide a method and an apparatus by means of which settling curves can easily be registered and evaluated at high accuracy. The basic idea of the invention is that variations of the tangent directions within a suitably small section of the settling curve is determined by the relative quantity of particle fractions the settling of which just finishes in the given instant. Thus, not only the basic curve but also its first and second derivatives have to be determined. The first derivative shows the variations of the settling velocity whereas the second derivative is characteristic of acceleration variations. The method according to the invention consists in determining and registering simultaneously the course of separation and its velocity and acceleration on basis of weight and specific weight variations in form of a basic curve, a velocity curve, and an acceleration curve, respectively, ascertaining the particle distribution in the liquid mixture on basis of said acceleration curve, delimiting predetermined time periods on said acceleration curve, projecting such time periods onto said velocity curve, indicating partial areas associated with various particle fractions in a total area below said velocity curve determining the sizes of said total area and said partial areas by means of planimetry, and calculating the mutual quantities of predetermined particle fractions from the mutual relation of said areas, and the particle sizes from the settling times of respective fractions on basis of the Stokes law. Such method can be performed by means of an apparatus having a feeler body suspended on an arm of a balance and responsive to weight variations due to separation of solid constituents from a liquid mixture, a magnetic system consisting of magnets and coils and excited by movements of said balance, a transformer connected to the output of said magnetic system and suitable for differentiating its output signals, and recorder means for registering the movements of said balance and output signals of said magnetic system and said transformer.

Further objects and details of the present invention will more fully be described by taking reference to the accompanying drawings.

FIG. 1 of which shows, by way of example, a system of curves plotted by means of the method according to the invention.

FIG. 2 is a diagrammatic view of an exemplified embodiment of the apparatus according to the invention.

FIG. 3 illustrates a partial view of another exemplified embodiment thereof.

Same reference characters designate similar details throughout the drawings.

Figure 1:
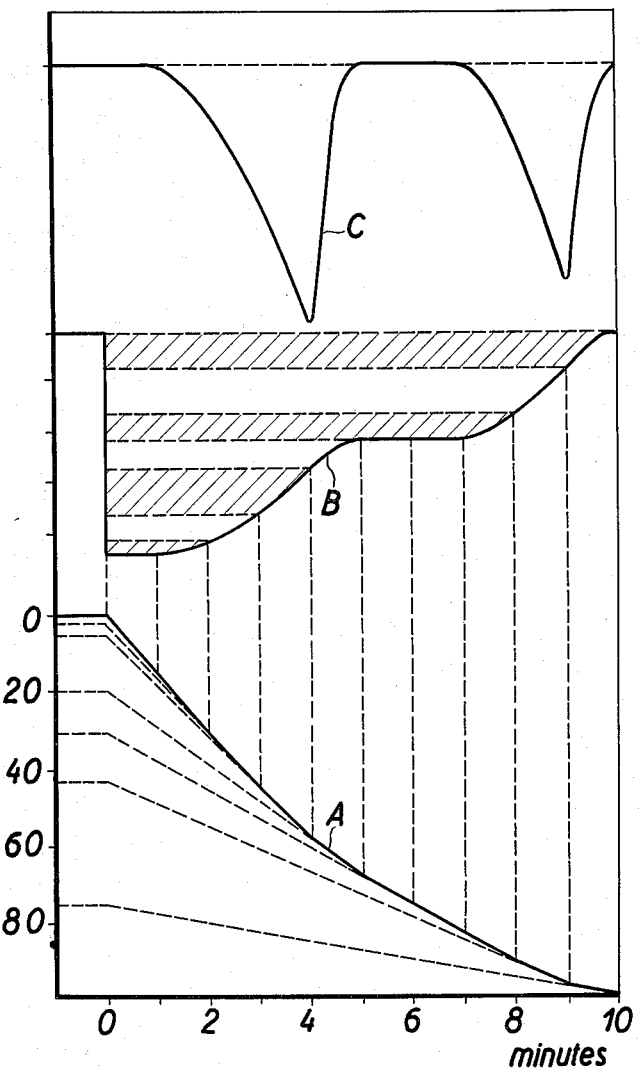

Referring to FIG. 1, the abscissa axis of the diagram serves as time axis whereas the vertical axis shows values of weight or of specific weight (curve A), velocity of weight or specific weight variations (curve B) and acceleration of weight or specific weight variations (curve C), respectively.

As is known, curve A serves for determining the quantity and the size of particles of a given fraction by means of drawing tangents of the curve at the end points of delimited sections. Obviously, to draw such tangents would suppose an exact knowledge of the radius associated with the point in question which is not the case. Moreover, there are brake points at which drawing of tangents is obviously impossible. Consequently, values as to the quantity and particle size of a given fraction are of little accuracy.

By means of curve B the first derivative, however, an accuracy in evaluation can be obtained which is by orders of magnitude higher than the accuracy obtainable with the usual method of drawing the tangents. The instants between which the relative quantity of individual particle fractions and their size has to be determined, are projected to or designated on curve B and such points are projected in horizontal directions to the axis of ordinates. The total area beneath the curve is proportional to the quantity of the total mass of settled material whereas the partial areas delimited by the abscissae of the end points of selected time periods are proportional to the relative quantity of the particle fraction in question. Taking the total area beneath curve B for 100%, determining the size of the total and partial areas by means of planimetry, and relating such areas to one another, results are obtained directly in percentages.

Plotting the second derivative will obviously further the accuracy of evaluation since it represents the particle distribution and the course of separation of the constituents of the investigated liquid mixture at a still higher accuracy and more illustratively. For instance, curve C in FIG. 1 shows two well defined maxima which are characteristic of inflection points of the first derivative (curve B) and, thus, enhance accurate projectings of such points—if necessary—onto the axis of ordinates.

A particle distribution determined by means of the method according to the present invention has been found to be.

| Time: | Percentage of particles settled, percent |
|---|---|
| 0 to 1 minute | 0 |
| 1 to 2 minutes | 1 |
| 2 to 3 minutes | 4 |
| 3 to 4 minutes | 16 |
| 4 to 5 minutes | 10 |
| 5 to 6 minutes | 0 |
| 6 to 7 minutes | 0 |
| 7 to 8 minutes | 12 |
| 8 to 9 minutes | 32 |
| 9 to 10 minutes | 25 |

Obviously, it would have been impossible to determine particle distribution with such accuracy on basis of the settling curve, which does not indicate, among other things, that no particles with sizes were present which would have been settled between 0 and 1 minute and between 5 and 7 minutes.

An exemplified embodiment of the apparatus used for carrying out the method according to the invention as illustrated in FIG. 2 comprises a sedimentation balance or scale 1 having a tray 3 submerging in a suspension S contained in a receptacle 2 the particle distribution of which has to be determined. The pointer or index 4 of the balance carries a screen 5 with a longitudinal slot which cooperates with a source of light 6 such as an electric lamp. The light of the lamp 6 falls through the slot in screen 5 onto a light sensitive band 8 on the drum 7 of a registering device known per se.

The tray 3 is suspended at one extremity of an arm 9 of the balance 1, the other extremity of arm 9 carrying a coil 10 of a high number of windings. The coil 10 is displaceably arranged in the gap of a permanent magnet 11. Obviously, the mutual arrangement of coil 10 and magnet 11 could be reversed. The output terminals of the coil 10 are, on the one hand, connected to the input terminals of a galvanometer 12 with a light index 12a. On the other hand, the output terminals of coil 10 are connected to the terminals of a primary winding of a transformer 14 the secondary of which is connected to input terminals of a galvanometer 15 with a light index 15a.

In operation, the receptacle 2 is filled with a suspension S the particle distribution of which has to be determined. The registering device is put on so that drum 7 rotates proportionally to time as indicated by an arrow 18. As long as no material settles on tray 3 the light index 6a of lamp 6 is not deflected and describes a straight line on the progressing band 8 on the evenly rotating drum 7 of the registering device. Then, particles in the suspension S commence to settle on the tray 3 and their increasing weight causes the arm 9 of balance 1 to become angularly displaced in the counter clockwise sense as regards FIG. 2. Thus, index 4 of the balance rotates likewise in the counter clockwise sense and carries along the screen 5 with its longitudinal slot. It means that light rays of lamp 6 are deflected and the light index 6a describes a curve A on band 8.

Due to angular displacement of balance 9 the coil 10 becomes displaced in the gap of permanent magnet 11 the strong magnetic field of which induces a voltage in the windings of coil 10. The induced voltage will obviously be proportional to the velocity of displacement which means that the galvanometer 12 and the primary winding of transformer 14 receive the first derivative of the displacements of the balance arm 9. Thus, the deflections of galvanometer 12 and of its light pointer 12a will be proportional to the first derivative of the balance arm displacements and the light pointer 12a of galvanometer 12 will correspondingly describe curve B on the light sensitive band 8.

On the other hand, in the secondary winding of transformer 14 the first derivative of the voltage in its primary will be induced. The voltage in the primary winding of transformer 14 being itself a first derivative, the input signal of galvanometer 15 will be the second derivative of the voltage induced in coil 10. Accordingly, the light pointer 15a of galvanometer 15 describes the aforementioned acceleration curve C on the light sensitive band 8.

The time preselected for the investigation and separation of the solid particles in the suspension S having elapsed, the registering device is stopped and the light sensitive band 8 removed from drum 7. Developing the diagram, the curves A, B, C are obtained as illustrated by way of example on FIG. 1. The particle size or the settling fractions are characterised by the time period necessary for settling of such fractions. On basis of the settling time thus obtained Stokes' Law permits to calculate the particle size itself as described for instance by F. V. Hahn in his book "Dispersoidanalyse," edited by Verlag T. Steinkopff, Dresden-Leipzig (Germany) in 1928.

FIG. 3 shows an exemplified embodiment wherein the tray 3 of the previous embodiment is substituted by a float 17 suitable for measuring the variations of the specific weight of liquid mixtures such as suspensions or emulsions. Otherwise, the operation and constructional details of the apparatus are the same as with the previous embodiment. Obviously, both the tray 3 and the float 17 form feeler bodies responsive to weight variations due to separation of solid constituents from a liquid mixture such as the suspension S in receptacle 2.

With the exemplified embodiments described above, light pointers 6a, 12a and 15a have been shown for registering and plotting the curves A, B and C, respectively, so as to register the output signals of the magnetic system 10, 11 and the pair of galvanometers 12 and 15. Obviously, any other means suitable for such registering could be employed such as mechanically driven writing pens set into motion and deflected by mechanical means connected in driving relationship to the balance index 4 and to the movable coils of the galvanometers 12 and 15, respectively.

What we claim is:

1. In a method for investigating the course of separation of solid particles in a liquid mixture such as suspensions and emulsions, the steps of simultaneously determining and registering the course of separation and its velocity and acceleration on basis of weight and specific weight variations and obtaining thereby a settling curve, a velocity curve and an acceleration curve ascertaining particle distribution in said liquid mixture on basis of said acceleration curve, delimiting predetermined time periods on said acceleration curve, projecting said time periods onto said velocity curve, indicating partial areas associated with various particle fractions in a total area below said velocity curve, determining the sizes of said total and partial areas, respectively, by means of planimetry, and calculating mutual quantities of predetermined particle fractions from the relation of said partial areas, and the particle sizes from the settling times of respective fractions on basis of Stokes' Law.

2. An apparatus for determining quantities of preselected particle fractions in liquid mixtures such as suspensions and emulsions, comprising a balance with an arm, a receptacle suitable for containing liquid mixtures, a feeler body suspended on said arm of said balance and disposed in said receptacle so as to respond to weight and specific weight variations due to separation of solid particles from said liquid mixture, a magnetic system comprising a permanent magnet element and a coil element, one of said elements being connected to said arm, a transformer connected to the output of said coil element for differentiating output signals of said magnetic system excited by movements of said balance arm caused by weight and specific weight variations of said liquid mixture, and means for simultaneously registering said movements of said balance arm and said output signals of said magnetic system and output signals of said transformer.

References Cited by the Examiner
UNITED STATES PATENTS 2,397,038    3/1946    Obenshain et al. _____ 73—61

DAVID SCHONBERG, *Acting Primary Examiner.*